(12) United States Patent
Wäller et al.

(10) Patent No.: US 8,766,911 B2
(45) Date of Patent: Jul. 1, 2014

(54) MULTIFUNCTION DISPLAY AND OPERATING DEVICE AND METHOD FOR OPERATING A MULTIFUNCTION DISPLAY AND OPERATING DEVICE HAVING IMPROVED SELECTION OPERATION

(75) Inventors: Christoph Wäller, Braunschweig (DE); Markus Missall, Braunschweig (DE); Mathias Thom, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 573 days.

(21) Appl. No.: 12/600,327

(22) PCT Filed: May 9, 2008

(86) PCT No.: PCT/EP2008/003933
§ 371 (c)(1),
(2), (4) Date: May 6, 2010

(87) PCT Pub. No.: WO2008/138638
PCT Pub. Date: Nov. 20, 2008

(65) Prior Publication Data
US 2010/0214238 A1    Aug. 26, 2010

(30) Foreign Application Priority Data

May 16, 2007 (DE) .......................... 10 2007 023 290

(51) Int. Cl.
*G06F 3/041* (2006.01)
(52) U.S. Cl.
USPC ............................ 345/156; 345/173; 340/988
(58) Field of Classification Search
CPC .................. B60K 35/00; B60K 37/06; B60K 2350/1024; B60K 2350/1028; B60K 2350/2013; G11B 19/022
USPC ........................... 345/173–184; 340/988–996, 340/425.5–426.22
See application file for complete search history.

(56) References Cited

U.S. PATENT DOCUMENTS

| 4,731,769 A | 3/1988 | Schaefer et al. ................... 369/6 |
| 5,923,267 A | 7/1999 | Beuk et al. ............... 340/825.56 |
| 6,091,956 A * | 7/2000 | Hollenberg ................ 455/456.5 |
| 6,373,472 B1 * | 4/2002 | Palalau et al. .................. 345/173 |

(Continued)

FOREIGN PATENT DOCUMENTS

| CN | 1848007 A | 10/2006 | ............. B60K 35/00 |
| DE | 3514438 C1 | 9/1986 | ............. B60K 35/00 |

(Continued)

OTHER PUBLICATIONS

Notification of Transmittal of Translation of the International Preliminary Report on Patentability, PCT/EP2008/003933, 13 pages, Mailed May 9, 2008.

*Primary Examiner* — Amare Mengistu
*Assistant Examiner* — Vinh Lam
(74) *Attorney, Agent, or Firm* — King & Spalding L.L.P.

(57) ABSTRACT

A multifunction display and operating device of a motor vehicle and comprise a display device (4), a control unit linked to the display surface (6) for implementing a user interface and at least one detection unit (8). The user interface comprises at least one display and operating context, display information depending on the display context being represented in a context information area (21) in a display mode on a display surface (6) and additional, cross-context information being represented in a status information area (22), and a change into an operating mode is initiated by an actuating action detectable by the detection unit, additionally or alternatively representing operating information depending on the operating context in the context information area, a change to a selection operating mode is initiated by a further detectable actuating action, selection information linked to a selection of an operating parameter being displayed in the status information area.

20 Claims, 4 Drawing Sheets

(56) References Cited

U.S. PATENT DOCUMENTS

| | | | |
|---|---|---|---|
| 6,956,470 B1 | 10/2005 | Heise et al. | 340/438 |
| 7,624,339 B1* | 11/2009 | Engel et al. | 715/214 |
| 7,750,795 B2* | 7/2010 | Nagata | 340/438 |
| 7,969,290 B2* | 6/2011 | Waeller et al. | 340/438 |
| 2005/0096812 A1 | 5/2005 | Nezu et al. | 701/36 |
| 2006/0132460 A1* | 6/2006 | Kolmykov-Zotov et al. | 345/173 |
| 2006/0261672 A1 | 11/2006 | Richter | 307/10.1 |
| 2007/0256027 A1 | 11/2007 | Daude | 715/810 |
| 2008/0024457 A1* | 1/2008 | Fliegner et al. | 345/173 |
| 2008/0055260 A1* | 3/2008 | Posamentier | 345/173 |
| 2009/0163140 A1* | 6/2009 | Packham et al. | 455/41.2 |
| 2009/0325557 A1* | 12/2009 | Wada | 455/414.4 |

FOREIGN PATENT DOCUMENTS

| | | | | |
|---|---|---|---|---|
| DE | 4121180 | | 1/1993 | G09G 3/00 |
| DE | 10231806 A1 | | 5/2004 | B60R 16/02 |
| DE | 102006028046 | | 12/2007 | B60K 35/00 |
| DE | 102007005026 A1 | | 8/2008 | G06F 3/02 |
| EP | 0701926 A2 | | 8/1995 | B60R 16/02 |
| EP | 1228917 | | 8/2002 | B60K 37/06 |
| EP | 1935704 | | 11/2007 | B60K 37/06 |
| KR | 1020040108208 A | | 12/2004 | B60R 11/02 |
| KR | 1020050001259 A | | 1/2005 | H04B 1/40 |
| KR | 1020050030612 A | | 4/2005 | C03C 18/16 |
| KR | 100643771 B1 | | 11/2006 | G11B 20/04 |
| WO | 0075766 | | 12/2000 | G06F 3/033 |
| WO | 03012618 | | 2/2003 | G06F 3/033 |
| WO | 2004/078536 A2 | | 9/2004 | B60R 25/00 |
| WO | 2005/066750 | | 7/2005 | G06F 3/033 |
| WO | 2006003588 | | 1/2006 | G06F 3/033 |
| WO | 2006003590 | | 1/2006 | G06F 3/033 |
| WO | 2007043230 | | 4/2007 | G06F 3/041 |

* cited by examiner

MULTIFUNCTION DISPLAY AND OPERATING DEVICE AND METHOD FOR OPERATING A MULTIFUNCTION DISPLAY AND OPERATING DEVICE HAVING IMPROVED SELECTION OPERATION

CROSS-REFERENCE TO RELATED APPLICATIONS

This application is a U.S. National Stage Application of International Application No. PCT/EP2008/003933 filed May 9, 2008, which designates the United States of America, and claims priority to German Application No. 10 2007 023 290.1 filed May 16, 2007, the contents of which are hereby incorporated by reference in their entirety.

TECHNICAL FIELD

The invention relates to a multifunction display and operating device of a motor vehicle and a method for operating a multifunction display and operating device, which comprises a display device, a control unit linked to the display device for implementing a user interface, and at least one detection unit, wherein the user interface comprises at least one display context and one operating context, wherein in a display mode display information dependent on the display context is displayed on a display surface of the display device in a context information area and in addition cross-context status information is displayed in a status information area, and via an actuating action detectable by the detection unit a change in a operating mode is being able to be initiated in which the operating information dependent on the operating context is additionally or alternatively displayed in the context information area.

BACKGROUND

In today's modern motor vehicles so called multifunction display and operating devices are commonly used, which are used to display information about vehicle systems, vehicle functions, services internal to and/or external to the vehicle and so on, as well as for context dependent operating devices. For this purpose a display surface of the display device is preferably coupled with a position sensitive sensor. For example, the display device is designed as a touch screen on which virtual control elements are shown. Likewise, the display device, also if it is not designed as a touch screen, may be used to assign functions, functionality and so on to each of other control elements positioned around the display device or spaced from the display device. This is to mean, that a so called control element mapping is shown on the display surface, which indicates the function, functionality and so on for a dedicated control element. Such information indicating a control element mapping, and virtual control elements which are displayed on a display surface, are considered as operating information together with such information, which is intended to support or allow an operation.

In order to create a clear and comprehensible user interface for a driver and/or a co-driver of a motor vehicle it is arranged according to the art to organize the single functions, functionalities and so on into display and operating context. Therefore, in a display and operating context single functions may be combined which, for example, characterize a specific vehicle system and/or are necessary for the operation thereof. Here, preferably information about the respective vehicle system, the respective vehicle function and so on corresponding with a display context is displayed in a display mode. In a second mode, an operation of the respective vehicle system or the functions linked thereto may preferably be carried out. Such a mode is also known as an operating mode. For this purpose, operating information preferably comprising control elements and/or a control element mapping is displayed on the display surface.

From DE 102 31 806 A1 a method and an apparatus for operating groups of functions and/or functions comprising a number of control elements are known, wherein the control elements comprise view boxes. There it is allowed for, that depending on the operation level different function groups and/or function assignments are generated in the view boxes of the control elements. This means, that depending on the context different functions and/or function groups may be assigned to each of the control elements. Thereby it is feasible to actuate a plurality of functions and functionalities using a relatively small number of control elements.

From WO 2005/066750 A1 it is known a operating system for a vehicle comprising a screen display having multiple display areas for displaying items of a structured menu comprising multiple menu levels, a manually operated actuation means for selection and/or activation of at least one item in a current menu level of the menu structure, speech control means for a redundant selection and/or activation of at least one item from the menu structure, which simultaneously forms a key word for the speech control means. There it is allowed for that the items of the menu structure are divided into different groups, wherein a first group comprises items which may only be selected and/or chosen using the manually operated actuation means and wherein a second group comprises items which may be selected and/or activated using the manually operated actuation means and/or the speech control means, and wherein the second group is divided into at least two item groups which may be defined using simple rules and which determine what kind of key words may currently be input for operating the menu.

In order to allow for a better delivery of information a multifunction display and operating device is described in the not yet published patent application DE 10 2007 005 026.9 of the applicant of the current application which divides a display area of the display surface into a context information area and a status area. In the status area information is displayed which may frequently be related to one display and operating context, which, however, also is of high interest to a user in one or more other display and operating context. In particular, the information from the status area of the proposed multifunction display and operating device comprises context identifier information, which comprises information about different selectable display and operating context. Furthermore, the status area preferably comprises information which is frequently desired by a user, for example preselected temperature values for the interior temperature of a motor vehicle, information about a replay status of an audio system, about a current media source for the audio system (compact disc player, radio, MP3 player, memory card, mobile telephone and so on), a time, a exterior temperature or the like. Here, the information interest of the user also existing in an operating context is served in an improved way.

All known devices have in common, that the display surface of the multifunction display and operating device is limited. In particular, in an operating context the operating information has to be displayed in a way adapted to the needs of the operator. In particular, in situations in which a selection between multiple similar elements or an input of a value has to be carried out during operation, these are feasible only unsatisfactory using known apparatuses and methods. An actuating action carrying out or supporting such a selection is denominated as a selection actuating action or in short a selecting action.

SUMMARY

According to various embodiments, a multifunction display and operating device can be provided by which a more simple, in particular a more intuitive usage low in operating actions, of differing vehicle systems and/or services and/or functions is feasible, through which in particular a improved control is feasible during a selection actuating action.

According to an embodiment, a multifunction display and operating device of a motor vehicle, may comprise a display device, a control unit linked to the display surface for implementing a user interface as well as at least one detection unit, wherein the user interface comprises at least one display context and one operating context, wherein in a display mode display information dependent on the display context is displayed on a display surface of the display device in a context information area and in addition cross-context status information is displayed in a status information area, and via an actuating action detectable by the detection unit a change in a operating mode is being able to be initiated in which operating information dependent on the operating context is displayed additionally or alternatively in the context information area, wherein by means of a further detectable actuating action a change in a selection operating mode is being able to be initiated in which selection information linked to a selection of a operating parameter is displayed in the status information area.

According to a further embodiment, the selection information may comprise discrete list elements. According to a further embodiment, the selection information may comprise a visualization, in particular a progression diagram or a bar diagram, of a parameter value selectable from a selection range. According to a further embodiment, the at least one detection unit may comprise a contactless detecting position determination unit which can determine a position of an actuating element of a user, in particular a position of a finger, in a spatial area at least in front of the display surface, and a presence of the actuating element in an activation area spatially located in front of the display surface is detectable as the actuating action. According to a further embodiment, by means of the at least one detection unit a presence of the actuating element in an actuating area can be detectable as a further actuating action, wherein the actuating area comprises a spatial area adjacent to at least one selection control element which is usable to select the operating parameter. According to a further embodiment, the at least one detection unit may comprise a touch-sensitive position detection unit, which in conjunction with the display surface is formed into a touch screen. According to a further embodiment, a selecting action which causes a selection of the operating parameter can be detected as a further actuating action. According to a further embodiment, a time determination unit can be provided to automatically allow for a change into the display mode after an expiration of a activation pause time period starting at a termination of the actuating action and/or for a change from the selection mode into the operating mode or the display mode after a activation information pause time period starting at a termination of the further actuating action. According to a further embodiment, the operating information may comprise transparently designed virtual control elements which in the operating mode are displayed above the information of the display mode. According to a further embodiment, the depicted operating information can be adapted to the actually available operating options.

According to another embodiment, a method for operating a multifunction display and operating device of a motor vehicle, comprising a display device, a control unit linked to the display surface for implementing a user interface, as well at least one detection unit, wherein the user interface comprises at least one display context and one operating context, may comprise the steps of: displaying display information dependent on the display context in a context information area on a display surface of the display device and in addition cross-context information in a status information area during a operation of the display and operating apparatus in a display mode; monitoring the detection unit to change into an operating mode upon a detection of an actuating action; additional or alternative displaying of operating information dependent on the operating context in the context information area in the operating mode; and during an operation of the display and operating apparatus in the operating mode a monitoring of the detection unit is taking place to change into selection operating mode upon a detection of a further actuating action, wherein in the selection operating mode selection information linked to a selection of a operating parameter is displayed in the status information area.

According to a further embodiment, the selection information may comprise discrete list elements. According to a further embodiment, to visualize the selection information a progression diagram or a bar diagram of a parameter value selectable from a selection range can be depicted. According to a further embodiment, the at least one detection unit may comprise a contactless detecting position determination unit which can determine a position of an actuating element of a user, in particular a position of a finger, in the spatial area at least in front of the display surface, and a presence of the actuating element in an activation area spatially located in front of the display surface (6) is detected as the actuating action. According to a further embodiment, by means of the at least one detection unit a presence of the actuating element in an actuating area can be detected as a further actuating action, wherein the actuating area comprises a spatial area adjacent to at least one selection control element which is usable for selecting the operating parameter. According to a further embodiment, the at least one detection unit may comprise a touch-sensitive position detection unit, which is formed into a touch screen in conjunction with the display surface, and a selecting action which causes a selection of the operating parameter is detected as a further actuating action. According to a further embodiment, a time determination unit may be used to determine a expiration of a activation pause time period starting at a termination of the actuating action and/or a expiration of a activation information pause time period starting at a termination of the further actuating action, and wherein after the expiration of the activation pause time period a automatic change into the display mode occurs and/or after the expiration of the activation information pause time period a automatic change from the selection mode into the operating mode or the display mode occurs. According to a further embodiment, the operating information may comprise transparently designed virtual control elements which in operating mode are displayed above information of the display mode. According to a further embodiment, in the operating mode and/or in a further operating mode only actually available operating options of an operating context can be depicted in a manner adapted to a number of the actually available operating options in the operating context, in each case optimized for a secure operability.

BRIEF DESCRIPTION OF THE DRAWINGS

In the following, various embodiments are described in more detail with respect to the drawings in which.

DETAILED DESCRIPTION

Figure 1:
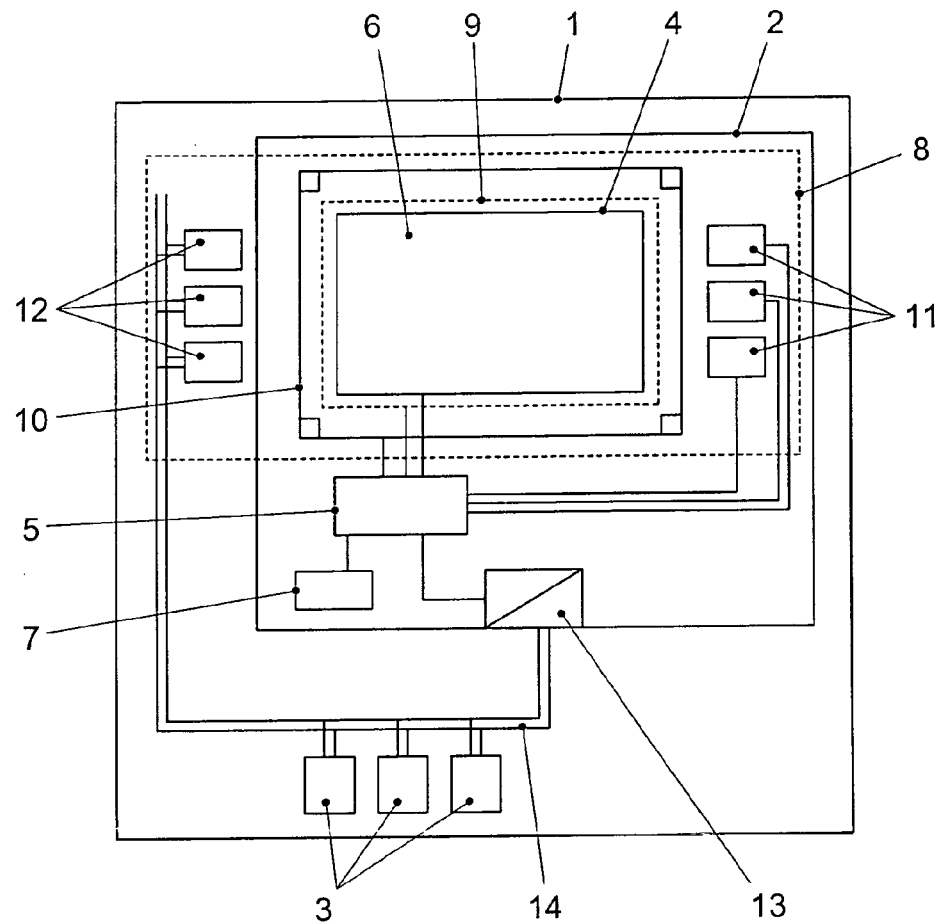
FIG. 1 shows a schematic depiction of a motor vehicle comprising a multifunction display and operating device.

According to a first aspect an optimized usage of the display surface provided with respect to the information interest is provided for in that a preferably maximized space for operating information, in particular virtual control elements, is used. If further information is needed for executing and/or controlling a selecting action, then this further information, denominated as selection information, is prioritized with respect to other information, which is shown in addition to the mere operating information in a operating mode if applicable, for example status information, and is displayed in such a way, that a navigation of the user is preferably hindered as little as possible and a operating reliability is not influenced adversely. For this purpose it is allowed for in a above mentioned multifunction display and operating device of a motor vehicle that by means of a further detectable actuating action a change in a selection operating mode is being able to be initiated, in which selection information linked to a selection of a operating parameter is displayed in the status information area. This means, that during an operation of the display and operating apparatus in the operating mode a monitoring of the detection unit is taking place to change into a selection operating mode when a further actuating action is detected, wherein during the selection operating mode selection information linked to a selection of a operating parameter is displayed in the status information area. Thereby it is achieved that in addition to the context information area selection information linked to the selection of an operating parameter is displayed in the status information area. The operating information displayed in the context information area during the operating mode preferably is not altered in this connection. This way it is achieved that a navigation of a user is not affected negatively. If, for example, virtual control elements are displayed in the context information area, these may be displayed with the same size and at the same display location in the operating mode as well as in the selection operating mode. The selection operating mode may be regarded as a subordinate operation mode of the multifunction display and operating device. Regarded as an operating parameter is each value or each element from a list of elements which may be utilized as a parameter for a function or functionality of a system operable by the multifunction display and operating device. Even though status information is basically regarded important information for the user during the operating mode, in a selection situation the requirement to display the selection information in direct connection with the selection is ranked higher. In doing so, a selection of information or a feedback concerning the selection of an operating parameter is considerably improved. Selection information therefore is the information which characterizes the parameter to be selected, for example allows for or visualizes feasible values. Values may be numerical values as well as terms, symbols, and so on.

In an embodiment the selection information comprises discrete list elements. For example, this is favorable, when a music track, a radio station, a specific CD from a list of CDs, a folder or for example a value from multiple predefined values of a list has to be selected.

In another embodiment the selection information comprises a visualization, in particular a progression diagram or a bar diagram, of a parameter value selectable from a selection range. In this connection, a progression diagram may be designed continuous or discrete.

In some embodiments it may be allowed for that a change from the display mode into the operating mode is dependent on the actuation of a control element. A more simple and more intuitive operation, however, is achieved in an embodiment, in which the detection unit comprises a position determination unit detecting contactless, which may detect a position of an actuating element of a user, in particular a position of a finger, at least in the area in front of the display surface and where a presence of the actuating element in an activation area spatially located in front of the display surface is detectable as an actuating action. This means that by means of a contactless detecting position determination unit a position of the actuating element may be determined and a approach of the actuating element, which leads to a presence of the actuating element in an activation area spatially located in front of the display surface or in front of an control element provided for a selection of a parameter, is detected as an actuating action. For example, if the user, with her or his hand, approaches an control element which may be formed as a separately designed control element adjacent to or spaced from the display surface of the display device or approaches a virtual control element which is displayed on the display surface, then a switching from the display mode into the operating mode occurs without a separate actuation of an control element.

In a similar way it is favorable to allow for that by means of the at least one detection unit a presence of the actuating element in an actuating area is detectable as a further actuating action, wherein the actuating area comprises a spatial area adjacent to at least one selection control element which may be used to select the operating parameter. When a presence of the actuating element in an actuating area is detected this way, it may be derived therefrom that a selection operation action is to be carried out. In such a situation it is favorable to communicate, instead of the status information, the cross-context information and to display precise selection information linked to the selection of the operating parameter. An approach of the actuating element to a so called selection control element in an embodiment therefore leads to a (further) switching from the operating mode into the selection mode. This allows for a simple and intuitive operation. The movement of the actuating element, initially as a movement in the direction of the display surface, is detected as an actuating action and a change from the display mode to the operating mode is initialized. The further movement in the direction of a selection control element is detected as a further actuating action and initializes the change into the selection operating mode. While the actuating action is linked to an approach in the direction of an activation area which in principle may have any spatial form, an approach in the direction of an actuating area which must not be defined as a spatially contiguous area but may comprise multiple portions is linked to the further actuating action.

When different parameters may be selected in an operating context, then there may exist equitable selection modes next to each other and therefore multiple actuating areas.

In order to detect a concrete selection operation action it is allowed for in an embodiment that the at least one detection unit comprises a touch-sensitive position detection unit which is designed as a touch screen in conjunction with the display surface. This means that the display device of the multifunction display and operating device is designed as a touch screen. The detection unit therefore preferably comprises a contactless detecting position determination unit as well as a touch-sensitive position detection unit. By the coaction of both of these an optimum operation of the multifunction display and operating device is feasible. Upon an approach a switching occurs from the display mode into the operating mode and as soon as an intention for an actuation is detected which is meant to lead to a selection operation action a change into the selection operating mode occurs. In this mode, instead of the status information the selection information is displayed in the status area.

In a further embodiment it may be allowed for that a selecting action causing a selection of the operating parameter is detected as a further actuating action. This means that a switching into the selection operating mode comes along with a concrete selecting action. Thereby it is achieved that a feedback is given to the user which is linked to her or his selecting action. For example, in an audio operating context the title selected by a NEXT button is centrally displayed in the status information area. Adjacent on both sides the titles located in a title selection list are displayed. The title selected by means of the selecting action is preferably displayed using a highlighted visualization. Such a highlighting may for example be indicated by a coloring, a transparency level deviating from the other appearances, a flashing display, etc. In such an embodiment, for a contactless detected first actuating action, the contactless detecting position determination unit only has to allow for a "coarse" position determination relative to the display surface or the control elements. Exact position discrimination within an activation area is not required. This way a relatively simple approach sensor may be used as the contactless detecting position determination unit to detect an actuating action which initiates a change from the display mode into the operating mode.

A display of the selection information linked to the selection and the operating information linked to an operation, respectively, are of interest to a user only in connection with a selecting action and an actuating action, respectively. It is therefore favorable to display the display of the selection information and of the operating information, respectively, generally temporally correlated with the actuating action and a selection actuating action, respectively, or with a further actuating action. In an embodiment a time determination unit is therefore provided to automatically allow for a change in the display mode after an expiration of a activation pause time period starting at a termination of the actuating action and/or for a change from the selection mode into the operating mode or the display mode after a activation information pause time period starting at a termination of the further actuating action. The time determination unit therefore is used to determine an expiration of an activation pause time period starting at a termination of the actuating action and/or an expiration of an activation information pause time period starting at a termination of a further actuating action which may be a selecting action. Following the expiration of the activation pause time period an automatic change into the display mode occurs and/or after the expiration of the activation information pause time period an automatic change from the selection mode into the operating mode or the display mode occurs. In this connection, the change may occur abruptly or via a slow fading out, i.e. a lowering of a solidity level (an increasing of a transparency level), of the operating information and/or selection information.

In a further embodiment the operating information and/or the selection information is designed transparently and displayed as an overlay over the display information of the display mode and/or the status information. This is to mean, that for example in the operating mode transparently formed virtual control elements may be displayed as an overlay over the display information which is displayed in display mode. Thereby, even though partially limited, an information detection of the information displayed in the display mode is feasible. Likewise it is favorable to display the selection information transparently overlayed over the status information. Thereby it is feasible for the user to perceive the status information at the same time as the selection information.

The characteristics of the method according to various embodiments have the same advantages as the respective characteristics of the multifunction display and operating device.

In FIG. 1 a motor vehicle 1 is depicted schematically. Motor vehicle 1 comprises a multifunction display and operating device 2. The multifunction display and operating device 2 in the motor vehicle 1 on the one hand serves for communicating information to a user and on the other hand for operating functions integrated in the multifunction display and operating device 2 and/or further vehicle systems 3.

For this purpose, the multifunction display and operating device 2 comprises a display device 4. Display device 4 is coupled with a control unit 5 which controls the depiction of information on display device 4. For example, display device 4 is designed as a LCD display, as a plasma display or the like. It comprises a display surface 6 which is freely programmable.

Control unit 5 is coupled with a storage apparatus 7 in which a program code is stored which by coaction with control unit 5, which preferably is designed as a computing unit, causes an implementation of a user interface. Advantageously, the required information is additionally stored in the storage apparatus 7 to graphically display the information to be communicated to the user.

In order to detect user input a detection unit 8 is provided. On the one hand, detection unit 8 comprises a touch-sensitive position detection unit 9 which in conjunction with display device 4 is formed as a touch screen. In addition detection unit 8 comprises a contactless detecting position determination unit 10. With this unit 10 a position of an actuating element, in particular of a body part, preferably of a finger of user may be determined at least in the spatial area in front of the display surface 6.

Different embodiments for contactless detecting position determination units are known to those skilled in the art. One such contactless detecting position determination unit may for example operate by means of transferring high frequency signals via the user as is for example described in WO 2004/078536. Alternatively, sensor units based on cameras, based on ultrasound or based on optical sensors may be utilized by the position determination unit.

Such sensor units utilizing an optical method may for example be designed according to the following principle. An emitter LED emits a rectangular amplitude modulated light signal in an optical or infrared wavelength range. The light signal reflected by an object, for example by a body part, is detected using a photo diode. Via an invariable and undisturbed light path a reference light signal phase shifted by 180° and also rectangular amplitude modulated is sent from a compensation LED to the photo diode. The compensation LED is controlled via a closed loop by means of a control signal in such a way that the received reflected light signal of the emitter LED and the received reference light signal of the compensation LED compensate each other at the photo diode and a DC signal is detected. A variation of the control signal is a quantity for the distance of the object. A sensor unit designed following this principle is widely independent of variations in temperature and brightness. If multiple such sensor units are positioned in a spaced manner the position of the body part may be determined three-dimensionally in an area by means of triangulation.

In the embodiment described a actuating action may therefore be detected by means of the touch-sensitive position detection unit 9, which is formed as a touch screen in conjunction with the display device 4, as well as by means of the contactless detecting position determination unit 10. Additionally, detection unit 8 comprises the control elements 11 which are positioned adjacent to the display device 4. These control elements 11 may for example be designed as buttons, as turn and press actuators, etc. In addition, detection unit 8 may comprise further control elements 12 which are coupled with control unit 5 via an interface 13 of the multifunction display and operating device 2 and a data bus 14. Using the control elements 11 and the further control elements 12 also actuating actions may be detected this way. Via data bus 14 also the vehicle systems 3 operable by means of the multifunction display and operating device 2 are coupled.

Figure 2:
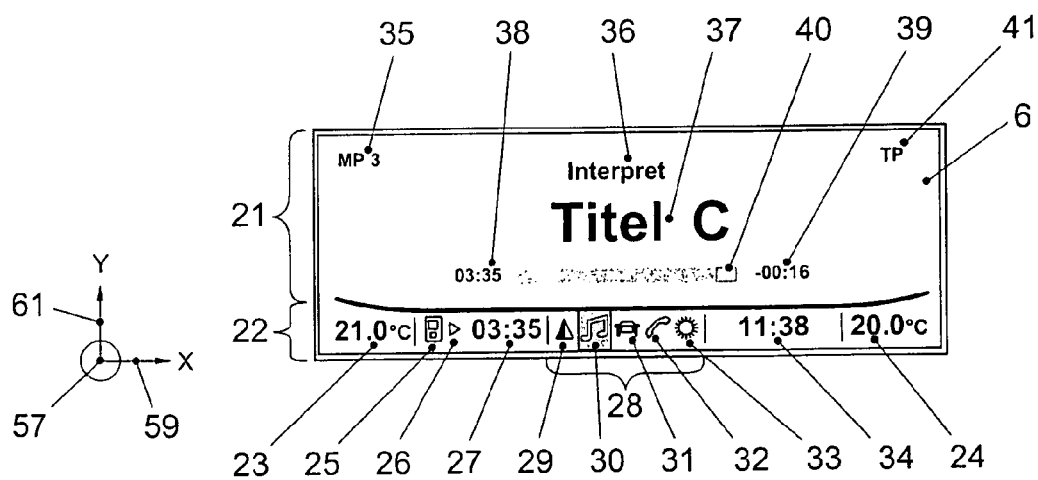
FIG. 2 shows a schematic view of a display surface of a multifunction display and operating device in display mode.

The multifunction display and operating device described is formed such that a user interface is implemented by means of control unit 5 and a program code stored in storage apparatus 7. Depicted schematically in FIG. 2 is a view of the display surface 6 in a display mode of the user interface. Display surface 6 comprises in an upper area a so called context information area 21 and in a lower area a status information area 22. Displayed graphically in the context information area 21 is information of a display context, here an audio replay context. Displayed in the status information area 22 is cross-context information. At the lower left boundary 23 as well as at the lower right boundary 24 of the status information area 22 temperature information is shown. The temperature information reflects a respective desired temperature in the half of the vehicle corresponding to the display position. This means that in the interior of the motor vehicle a temperature of 21° C. should prevail on the left side of the vehicle and a temperature of 20° C. on the right side of the vehicle. An active source symbol 25 indicates a sound source. In the example shown the sound source is a MP3 player. A triangle 26 indicates that a music track is currently replayed. Playback item information 27 indicates an already elapsed playback duration of the currently played track. Just as well a remaining playback duration of the played track, a total playback duration of a CD or of a play list etc. could be indicated. In a center of the status information area 22 a so called context identifier field 28 is located, in which different display and operating context is displayed in each case by means of a context identifier designed as a symbol. The context identifiers comprise from left to right a navigation context identifier 29, an audio context identifier 30, a vehicle context identifier 31, a telephone context identifier 32 and a common context identifier 33. The currently selected audio context identifier 30 is visually highlighted. Additionally displayed in the context information area 22 is a time information 34. Similarly a currently selected radio station could be displayed which is monitored for ongoing traffic information in a background operation. The status information displayed in the status information area 22 is characterized in that it is displayed in the status information area 22 in different display and operating context.

Displayed in the context information area 21 is the information corresponding to the current audio context identifier 30. The information displayed may be depending on the situation in this connection. This means that the information displayed may depend on the status of the vehicle and the vehicle system, respectively, of a vehicle service or a vehicle function, about which information is displayed in the current display context.

The display information of the view according to FIG. 2 in an upper left corner comprises an alphanumerical indication 35 about the sound source played. Furthermore, there are indicated an interpreter 36, a track 37, a already elapsed playback duration 38 and a remaining playback duration 39 of an acoustically reproduced song. Also, a playback duration in relation to an overall duration is graphically displayed in a progression diagram 40. By means of a further alphanumerical indication 41 it is indicated in an upper right corner that a so called "Traffic Pilot" is active. This means that in the background a traffic information station is monitored with respect to a broadcast of a traffic information.

Figure 3:
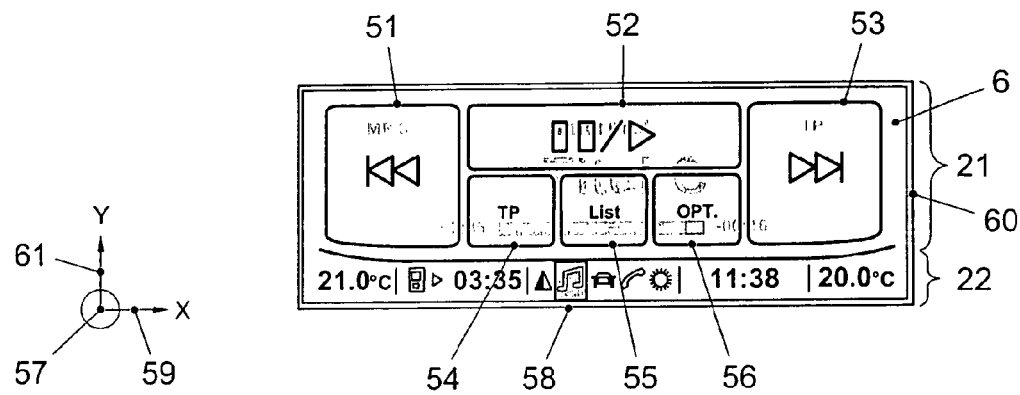
FIG. 3 shows a schematic view of a display surface of a multifunction display and operating device in operating mode.

Depicted in FIG. 3 is a view of the display surface 6 with operating context belonging to audio display context. Overlayed transparently as operating information in the foreground over the display information in the context information area 21 are pushbuttons formed as virtual control elements 51-56, which are depicted in display mode and are shown in FIG. 2. The virtual control elements 51-56 comprise a control element 51 formed as a return button, a control element 52 designed as a playback/pause button, a control element 53 formed as a fast forward button, a control element 54 formed as a Traffic Pilot button, a list control element 55 and a option control element 56. By means of the Traffic Pilot button control element 54 the Traffic Pilot may be enabled and disabled. At an actuation of the list control element 55 and of the option control element 56, in each case a further menu is displayed in the context display area 21. For example, by actuating the option control element 56 it can be switched into a second operating mode which is exemplified below with respect to FIG. 9 and FIG. 10.

Figure 6:
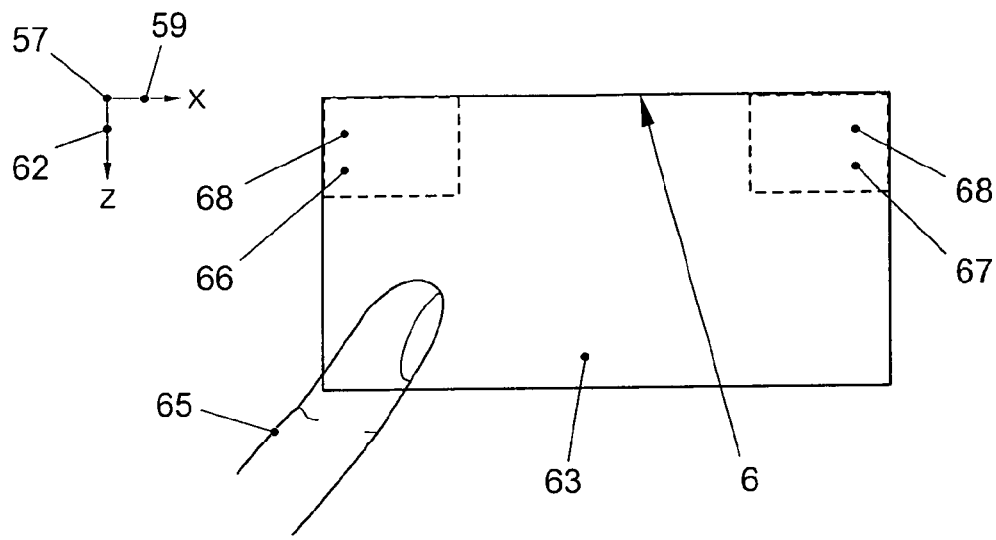
FIGS. 6 to 8 show schematic depictions of a spatial area in front of a multifunction display and operating device for illustrating an activation and an actuating area.

Also in the operating mode of the user interface the same status information is displayed in the status information area 22 as in the display mode. A change from the display mode into the operating mode may be caused by an actuating action. Such an actuating action may for example comprise actuating one of the control elements 11 of FIG. 1. Likewise, as an actuating action an approach to the display surface by means of an actuating element, for example a finger, may be utilized. For this purpose, relative to the display surface 6 of display device 4 of FIG. 1 a spatial area is preferably defined as a spatial activation area. Assuming that the display surface 6 is located in a XY plane, in which likewise the origin of right hand coordinate system is located, then the activation area preferably extends in a block shaped manner in a positive Z direction, i.e. extends out of the plane of projection of FIG. 2 and FIG. 3. Depicted in FIG. 6 is a top view of the XZ plane. Depicted in FIG. 3 is a coordinate system 57 comprising a X axis 59 oriented in parallel with a longitudinal side 58 of display surface 6 and a Y axis 61 oriented in parallel with a short side 60 of the display surface. A Z axis extends perpendicular from the projection plane. The same coordinate system 57 is depicted in FIG. 6. X axis 59 points to the right and a Z axis 62 points downward. In the example depicted an activation area 63 is a block shaped spatial area in front of the display surface 6 of the display device. If by means of the contactless detecting position determination unit a presence of an actuating element 65 is detected, which is a finger of a user, then a change is caused from the display mode, which is depicted in FIG. 2, into the operating mode, which is depicted in FIG. 3. Defined spatially adjacent to the control elements 51 and 53 of FIG. 3 formed as a fast forward button and a return button are respective portions 66, 67 of an actuating area 68. The portions 66, 67 preferably consist of virtual extrusion bodies formed along the Z axis, as they would be formed by an extrusion of the virtual control elements 51 and 53 along the Z axis.

Figure 7:
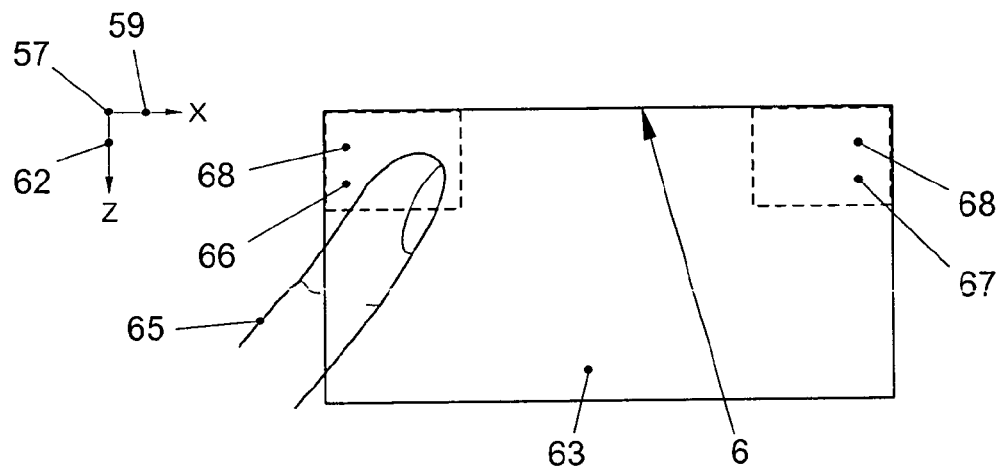

When there is detected a presence of the actuating element 65 within the actuating area 68, then this is interpreted as an operating actuation. This status is graphically depicted in FIG. 7. In a further embodiment the user interface now switches into a selection mode.

Figure 4:
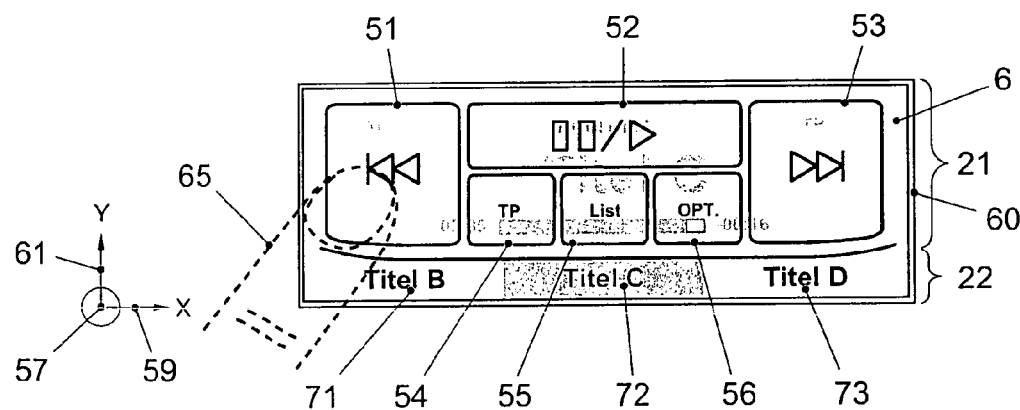
FIG. 4 shows a schematic view of a display surface of a multifunction display and operating device in selection mode.

Depicted in FIG. 4 is a view of the display surface 6 in selection mode. The view equals the view in operating mode of FIG. 3, however, differs in that in the status information area selection information is displayed instead of status information. This selection information comprises three track information fields 71-73. In a central position the track information field track C 72 is visually displayed across from the track information fields track B 71 and track D 73 positioned to the left and to the right. The accentuation indicates that track C is the currently played track. By means of an actuation of the return button control panel 51 track B may be selected and by means of an actuation of the fast forward button control element 53 track D may be selected. If such an actuation is carried out, then the selection information in the track information fields 71-73 changes accordingly. Thereby, a selection of a parameter, here a track to be played, is considerably facilitated for a user. In order to indicate that the actuating element 65 has a distance from the display surface the actuating element 65 of FIG. 4 is depicted in a dashed manner.

Figure 5:
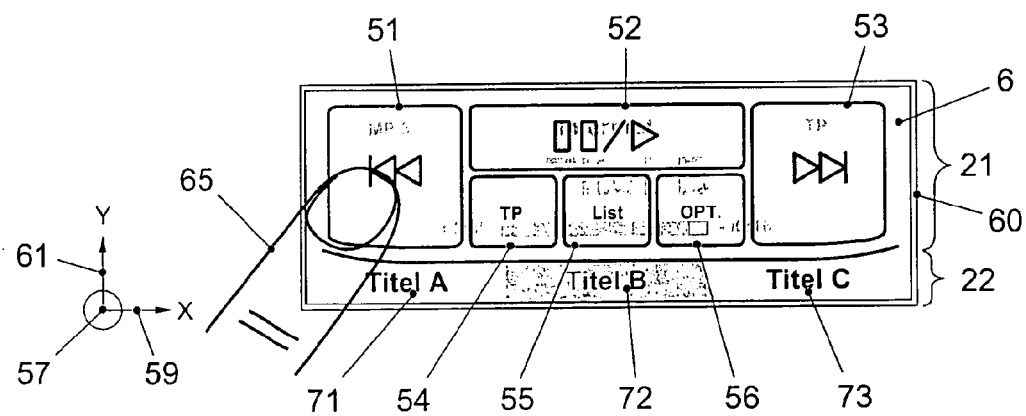
FIG. 5 shows a further schematic view of a display surface of a multifunction display and operating device in selection mode.

Depicted in FIG. 5 is a view in selection mode in which the selection is carried out by means of touching the display surface designed as a touch screen. The currently selected track now is track B, which is indicated by means of a graphical accentuation.

Figure 8:
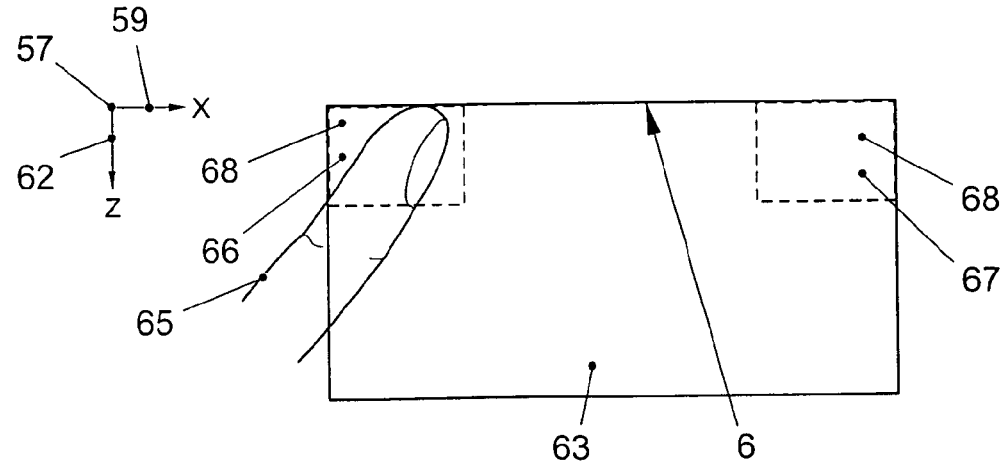

The touch of the display surface by means of the actuating element 65 is indicated graphically in that the actuating element is depicted by means of a solid line. The view in the XZ plane corresponding to FIG. 5 is depicted in FIG. 8.

If the actuating element 65 is removed from the actuating area 68, then by means of a time determination unit the time period is determined which has elapsed since leaving the actuating area. If this time period is greater than a so called activation information pause time period, a change back into the operating mode is carried out. In other embodiments it may be allowed for that a change into the display mode is carried out. Analogously, the time period since leaving the activating area is determined by the time determination unit. If this time period is greater than an activation pause time period, a change back from the operating mode into the display mode is carried out. The change from the selection operating mode into the operating mode causes the status information to be again displayed in the status information area 22. This transition may be carried out abruptly or by means of a fade out of the selection information. In a similar manner a transition from the operating mode into the display mode may be carried out abruptly or by means of a fade out of the operating information.

In order to achieve an easier perceptibility of failure information this information is preferably displayed in the status information area using an opacity of 100%, i.e. non transparent. In other embodiments it may, however, be allowed for that the failure information as well is displayed transparently above the status information. This has the advantage that all of the status information, even if limited when indicated, also is perceivable in the failure information mode.

In further embodiments in which no actuating areas are defined, a change from the operating mode into the selection mode may only be allowed for at an actuation of a control element linked to the selection of the parameter. In these embodiments the depiction of FIG. 3 is immediately followed by the view of FIG. 5. Even if in this embodiment no "preview" is feasible before the first selection actuating action, a monitoring potential for the selection carried out and a "preview" for a further selection actuating action is provided, however.

Yet further embodiments are conceivable in which the actuating action and/or further actuating actions are additionally or alternatively detectable by means of one of the control elements 11 or the further control elements 12.

Figure 9:
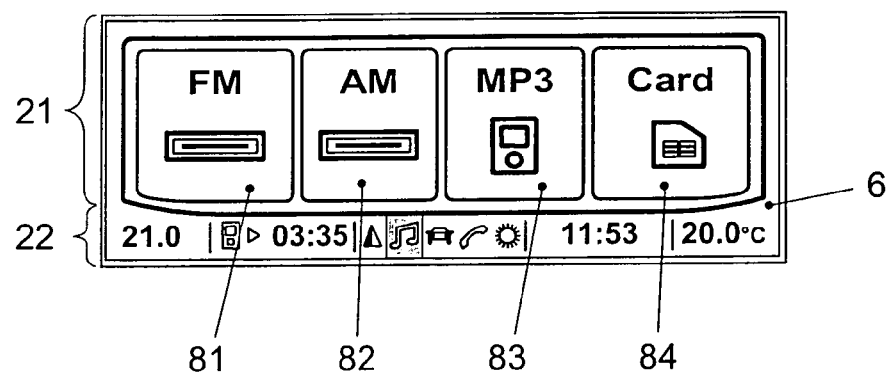
FIGS. 9 and 10 show schematic views of a display surface of a multifunction display and operating device in a second operating mode.
Figure 10:
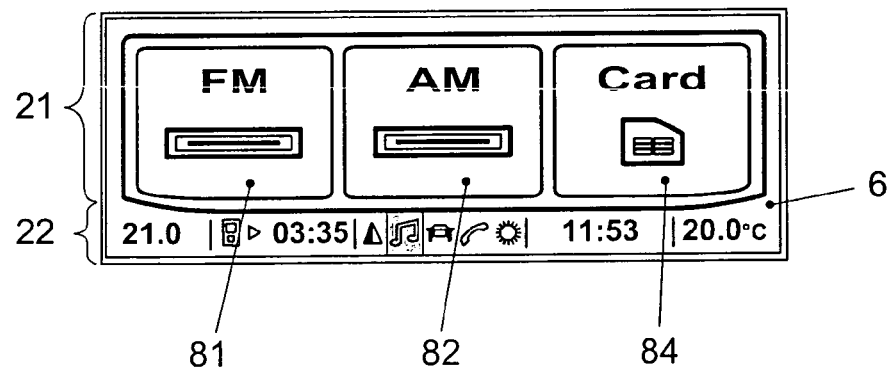

In addition, the user interface may comprise further modes. For example, a second operating mode may be allowed for in which further operating information preferably is depicted non transparent, i.e. as sole information, in the context information area 21 of the display surface. Depicted in FIGS. 9 and 10 are exemplary views of the display surface in the second operating mode. Implemented here is a further advantageous aspect by means of which a preferably secure and simple operation is allowed for via the multifunction display and operating device.

Depicted in the context information area 21 are respective virtual control elements 81 to 84 and 81, 82 and 84, by means of which an audio source may be selected in each case. By means of the control element 81 a frequency modulated radio (FM), by means of the control element 82 an amplitude modulated radio (AM), by means of the control element 83 a MP3 player and by means of the control element 84 a memory card may be selected as an audio source. The control elements 81 to 84 are designed such that they are each depicted with equal size and preferably optimally utilize a surface of the context information area 21. In this connection only control elements for the actually available audio sources are indicated. If, for example, the MP3 player is removed from the motor vehicle as a device, then the display of FIG. 10 is received in the second operating mode. Control panel 83 is not depicted any more. Instead, control panels 81, 82 and 84 are depicted enlarged, so that the entire surface of the context information area is utilized optimally. Advantageously, on the display surface of a display device formed as a touch screen in each case only the virtual control elements are depicted, which are selectable and/or operable via a currently available function or a currently available device. These virtual control elements are positioned on the display surface in the context information area such that a preferably high probability of success is ensured during an actuating action. Preferably, the virtual control elements are depicted on the display surface with equal size and preferably equally spaced to each other, so that preferably the entire surface of the display surface provided for context dependent information is utilized.

The second operating mode may also be implemented using a modified multifunction display and operating device of a motor vehicle for displaying information concerning vehicle systems, vehicle functions and/or services and for operating the vehicle systems, vehicle functions and/or services, comprising a display device, a control unit for implementing a user interface linked to the display surface as well as at least one position detection unit coupled to the display device, by which an actuation by means of an actuating element, in particular a body part, preferably a finger, of a user is detectable depending on a determined position of the actuating element relative to a depiction on the display surface, wherein depending on a status of the motor vehicle, the vehicle systems, the vehicle functions and/or services only certain operating options from all feasible operating options are provided and in one operating mode in each case only control elements from the available operating options are displayed, wherein the depiction of the available operating options is carried out such that a preferably optimal security of actuating is achieved for an actuating action using the actuating element.

In a multifunction display and operating device such modified or in the multifunction display and operating devices described beforehand above, dependent on a status of the motor vehicle, of the vehicle systems, of the vehicle functions and/or services the control unit preferably is formed to determine the currently available ones from all possible operating options.

Generally it holds true that the operating options available in the one operating mode (which in the example described above with respect to FIGS. 9 and 10 is the second operating mode) are preferably depicted by means of virtual control elements which in each case are positioned evenly distributed across a entire area of the display surface provided for control elements.

Likewise, it is favorable when the virtual control elements of the operating options provided in the one operating mode (which in the example described above with respect to FIGS. 9 and 10 is the second operating mode) in each case are depicted such that they have a equal dimension along a defined direction, for example in parallel to the longitudinal side of the display surface or the shorter side.

Furthermore, the virtual control elements of the operating options provided in the one operating mode (which in the example described above with respect to FIGS. 9 and 10 is the second operating mode) are in each case preferably depicted such that in each case concerning their surface they have assigned a equally large portion of the entire area of the display surface provided for the control elements.

Preferably, the virtual control elements of the operating options provided in the one operating mode (which in the example described above with respect to FIGS. 9 and 10 is the second operating mode) are in each case depicted such that a sum of their depiction surfaces covers at least 75%, preferably 90%, most preferred 100% of the entire area provided for the control elements.

Furthermore, it is favorable when the operating options are assigned to operating context and when the positions of the depictions and/or the sizes of the depictions and/or the sizes of the triggering areas of the operating options provided in the one operating mode (which in the example described above with respect to FIGS. 9 and 10 is the second operating mode) are adjusted depending on the number of the operating options provided in each operating context. A triggering area comprises the positions at which a respective control element may be triggered by the actuating element, in particular a body part, preferably a finger. The actuating element therefore is positioned within the triggering area when its position detected by position detection unit is positioned within the triggering area.

The embodiments depicted merely are exemplary embodiments of a multifunction display and operating device. It is to be understood by a person skilled in the art that the embodiment of a multifunction display and operating device proposed herein describes an independent innovative aspect in the manner that in an operating mode only the operating options are depicted which are currently available and then in each case are adapted accordingly with respect to the number of operating options currently provided in the respective operating context.

REFERENCE NUMERALS

1 motor vehicle
2 multifunction display and operating device
3 vehicle systems
4 display device
5 control unit
6 display surface
7 storage apparatus
8 detection unit
9 touch-sensitive position detection unit
10 contactless detecting position determination unit
11 control elements
12 further control elements
13 interface
14 data bus
21 context information area
22 status information area
23 lower left boundary
24 lower right boundary
25 source symbol
26 triangle
27 playback time
28 context identifier field
29 navigation context identifier
30 audio context identifier
31 vehicle context identifier
32 telephone context identifier
33 common context identifier
34 time indication
35 alphanumeric indication
36 interpreter
37 track
38 elapsed playback duration
39 remaining playback duration
40 progression diagram
41 further alphanumeric indication
51-56 control elements
57 coordinate system
58 longitudinal side of display surface
59 X axis
60 short side of display surface
61 Y axis
62 Z axis
63 activation area
65 actuating element
66, 67 portions
68 actuating area
71-73 track information fields
81-84 control elements

What is claimed is:

1. A multifunction display and operating device of a motor vehicle, comprising:
   a display device,
   a control unit linked to a display surface of the display device for implementing a user interface, and
   at least one detection unit,
   wherein the user interface comprises at least one display context and one operating context,
   wherein in a display mode display information dependent on the display context is displayed on a display surface of the display device in a context information area and in addition cross-context status information is displayed in a status information area of the display surface, and
   via a first actuating action detectable by the detection unit a change into a first operating mode is initiated in which operating information dependent on the operating context is displayed additionally or alternatively in the context information area, and
   wherein the control unit switches the user interface from the first operating mode to a selection operating mode in which selection information linked to a selection of an operating parameter is displayed in the status information area of the display surface when the detection unit senses a second actuating action;
   wherein selection of the operation parameter controls at least in part an operation of a system associated with the motor vehicle instead of an operation of the display device, the system associated with the motor vehicle selected from a group consisting of: a navigation system; a passenger temperature control system; an audio system; a telephone system; and a traffic information system.

2. The multifunction display and operating device according to claim 1, wherein the selection information comprises discrete list elements.

3. The multifunction display and operating device according to claim 1, wherein the selection information comprises a visualization of a parameter value selectable from a selection range.

4. The multifunction display and operating device according to claim 1, wherein the at least one detection unit comprises a contactless detecting position determination unit which can determine a position of an actuating element of a user or a position of a finger, in a spatial area at least in front of the display surface, and a presence of the actuating element in an activation area spatially located in front of the display surface is detectable as the actuating action.

5. The multifunction display and operating device according to claim 1, wherein by means of the at least one detection unit a presence of an actuating element in an actuating area is detectable as a further actuating action, wherein the actuating area comprises a spatial area adjacent to at least one selection control element which is usable to select the operating parameter.

6. The multifunction display and operating device according to claim 1, wherein the at least one detection unit comprises a touch-sensitive position detection unit, which in conjunction with the display surface is formed into a touch screen.

7. The multifunction display and operating device according to claim 1, wherein a selecting action which causes a selection of the operating parameter is detected as a further actuating action.

8. The multifunction display and operating device according to claim 1, wherein a time determination unit is provided to automatically allow both of the following: a change into the display mode after an expiration of an activation pause time period starting at a termination of the actuating action; and a change from the selection mode into the operating mode or the display mode after an activation information pause time period starting at a termination of the further actuating action.

9. The multifunction display and operating device according to claim 1, wherein the operating information comprises transparently designed virtual control elements which in the operating mode are displayed above the information of the display mode.

10. The multifunction display and operating device according to claim 1, wherein the depicted operating information is adapted to actually available operating options.

11. A method for operating a multifunction display and operating device of a motor vehicle, comprising a display device, a control unit linked to the display surface of a display device for implementing a user interface, as well at least one detection unit, wherein the user interface comprises at least one display context and one operating context, comprising the steps of:
   displaying display information dependent on the display context in a context information area on a display surface of the display device and in addition cross-context information in a status information area of the display surface during an operation of the display and operating apparatus in a display mode;
   monitoring the detection unit to change into an operating mode upon a detection of a first actuating action;
   additional or alternative displaying of operating information dependent on the operating context in the context information area in the operating mode; and
   during an operation of the display and operating apparatus in the operating mode monitoring the detection unit to change into a selection operating mode upon a detection of a second actuating action,
   wherein in the selection operating mode selection information linked to a selection of an operating parameter is displayed in the status information area;
   wherein selection of the operation parameter controls at least in part an operation of a system associated with the motor vehicle instead of an operation of the display device, the system associated with the motor vehicle selected from a group consisting of: a navigation system; a passenger temperature control system; an audio system; a telephone system; and a traffic information system.

12. The method of claim 11, wherein the selection information comprises discrete list elements.

13. The method of claim 11, wherein to visualize the selection information a progression diagram or a bar diagram of a parameter value selectable from a selection range is depicted.

14. The method of claim 11, wherein the at least one detection unit comprises a contactless detecting position determination unit which can determine a position of an actuating element of a user or a position of a finger, in the spatial area at least in front of the display surface, and a presence of the actuating element in an activation area spatially located in front of the display surface is detected as the actuating action.

15. The method of claim 11, wherein by means of the at least one detection unit a presence of the actuating element in an actuating area is detected as a further actuating action, wherein the actuating area comprises a spatial area adjacent to at least one selection control element which is usable for selecting the operating parameter.

16. The method of claim 11, wherein the at least one detection unit comprises a touch-sensitive position detection unit, which is formed into a touch screen in conjunction with the display surface, and a selecting action which causes a selection of the operating parameter is detected as a further actuating action.

17. The method of claim 11, wherein a time determination unit is used to determine an expiration of an activation pause time period starting at a termination of the actuating action and an expiration of an activation information pause time period starting at a termination of the further actuating action, and wherein after the expiration of the activation pause time period an automatic change into the display mode occurs or after the expiration of the activation information pause time period an automatic change from the selection mode into the operating mode or the display mode occurs.

18. The method of claim 11, wherein the operating information comprises transparently designed virtual control elements which in operating mode are displayed above information of the display mode.

19. The method of claim 11, wherein in the operating mode and/or in a further operating mode only actually available operating options of an operating context are depicted in a manner adapted to a number of the actually available operating options in the operating context, in each case optimized for a secure operability.

20. The multifunction display and operating device according to claim 1, wherein the selection information comprises a progression diagram or a bar diagram of a parameter value selectable from a selection range.

* * * * *